United States Patent [19]

Sakamoto et al.

[11] Patent Number: 4,885,513
[45] Date of Patent: Dec. 5, 1989

[54] SIDE SUPPORT DEVICE FOR A VEHICLE SEAT

[75] Inventors: Takao Sakamoto; Kiyotaka Takizawa, both of Akishiam, Japan

[73] Assignee: Tachi-S Co., Ltd., Tokyo, Japan

[21] Appl. No.: 304,712

[22] Filed: Feb. 1, 1989

[51] Int. Cl.⁴ .......................... A47C 7/46; B60N 1/06
[52] U.S. Cl. .................................. 318/468; 318/466; 297/284
[58] Field of Search ............... 318/466, 467, 468, 469, 318/470; 297/284, 311, 330, 353, 452, 460, 464, 486; 296/63, 64, 68.1, 147

[56] References Cited

U.S. PATENT DOCUMENTS

| 4,370,000 | 1/1983 | Kazaoka et al. | 297/284 |
| 4,500,136 | 2/1985 | Murphy et al. | 297/284 |
| 4,516,788 | 5/1985 | Umetsu et al. | 297/284 X |
| 4,537,444 | 8/1985 | Maruyama et al. | 297/284 |
| 4,592,588 | 6/1986 | Isono et al. | 297/284 |
| 4,634,179 | 1/1987 | Hashimoto et al. | 297/284 |
| 4,655,505 | 4/1987 | Kashiwamura et al. | 297/284 |
| 4,707,027 | 11/1987 | Horvath et al. | 297/284 |
| 4,747,639 | 5/1988 | Pfau | 297/284 X |

Primary Examiner—Bentsu Ro
Attorney, Agent, or Firm—Browdy and Neimark

[57] ABSTRACT

A side support device for use with a seat in a vehicle is disclosed. In the device, an inclination sensing switch for detecting the inclination of the seat is arranged in the seat and is also connected through a relay to a motor which is used to open or close a side support provided in the seat. The side support can be moved to its open or closed position according to the inclination of the seat.

6 Claims, 3 Drawing Sheets

SIDE SUPPORT DEVICE FOR A VEHICLE SEAT

BACKGROUND OF THE INVENTION

1. Field of the Invention

The present invention relates to a side support device for use with a seat in a vehicle which is capable of controlling the movement of a side support of the vehicle seat according to the operating conditions of the vehicle to prevent an occupant of the seat from losing his or her position.

2. Description of the Prior Art

When a vehicle goes around a curve, an occupant of a vehicle seat feels given an acceleration in a lateral direction to get the occupant down, due to generation of centrifugal force. As a result of this, the occupant is forced to lose his or her sitting position, which makes it difficult for the occupant to support his or her predetermined sitting position and also hurts the comfortable feel to the occupant of the ride to a great extent. Especially, in case of a driver of the vehicle, to lose his or her sitting posture may be an obstacle to the driving operation of the driver, which is dangerous.

To avoid this problem, conventionally, there have been proposed side support devices which are constructed to prevent the seat occupant from losing his or her sitting position to thereby support the user's predetermined comfortable sitting position, and such side support devices have been mounted to a driver's seat and the like.

For example, in one of the above-mentioned prior art side support devices, there is provided a side support which is disposed in a seat back of the seat. This side support is constructed such that it presses against and holds between the upper body of the occupant from both sides thereof to control the movements of the occupant's upper body so as to be able to support the predetermined sitting posture of the occupant by force. However, if the side support always supports the occupant's upper body from both sides thereof, then the occupant is deprived of the freedom of the movements of the upper body, which hurts the riding comfort of the occupant and makes the occupant uncomfortable and also makes the occupant tired. For this reason, the side support is normally positioned at an open position in which the occupant is not held and, only in case of need, it can be moved to a closed position for holding the occupant.

Also, as the side support device adapted to control the movements of the side support, there is widely known a device of a type that employs the lateral acceleration (acceleration in a lateral direction) as a parameter. The lateral acceleration can be detected directly by an acceleration sensor (for example, Japanese Utility Model Publication No. 97633 of 1985), or it may be found from the speed of a vehicle, curvature of a curve and the like (for example, Japanese Patent Publication (Tokkai) No. 67638 of 1986). In this type of side support device, the side support is moved to its closed position when the acceleration (namely, the lateral acceleration) exceeds a reference value. The parameter is not always limited to the acceleration. For example, in Japanese Utility Model Publication No. 97634 of 1985, the vehicle speed and the turning angle of a steering wheel are used as the parameter and, in Japanese Patent Publication (Tokkai) No. 197436 of 1985, the curvature of a curve and the vehicle speed are employed.

The parameter such as the lateral acceleration or the like is detected by a sensor and the detected value thereof is transmitted to a microcomputer, in which the value is compared with a reference value. When it is found that the detected value exceeds the reference value, then an output signal is transmitted from the microcomputer to a motor for driving the side support and, responsive to the output signal, the motor is rotated (in a forward direction) to thereby drive the side support to its closed position. When located at the closed position, the side support presses against and holds the upper body of the occupant therebetween to thereby prevent the occupant from losing his or her sitting posture. After then, for example, in a given time after the detected value goes below the reference value, an output signal is transmitted from the microcomputer to the motor. Responsive to this, the motor is rotated (in a reverse direction) to thereby move the side support to its open position, releasing the upper body of the occupant.

As described above, in the well known side support devices according the prior art, the parameters such as the lateral acceleration and the like are detected by use of the sensor and the detected value thereof is processed by the microcomputer. However, both the sensor and microcomputer are comparatively expensive and, therefore, the side support device employing such a microcomputer and sensor cannot be supplied at low prices.

Also, while the motor and microcomputer are disposed in the seat, the sensor is arranged in the body of the vehicle, not in the seat. For this reason, a wiring between the sensor and microcomputer must be provided externally of the seat, which makes the structure of the device complicated and thus the device cannot be mounted with ease.

SUMMARY OF THE INVENTION

The present invention aims at eliminating the drawbacks found in the above-mentioned prior art side support devices.

Accordingly, it is an object of the invention to provide a side support device for use with a seat in a vehicle which is simple in structure without using expensive sensors and microcomputers.

In attaining this object, according to the invention, special attention is paid to the fact that, when the vehicle moves around a curve, then occupant of the seat is forced to incline or lose his or her sitting position as the fact that well as the seat that is occupied by the occupant is also forced to incline. In other words, in the seat, an inclination sensing switch is arranged which is connected through a relay circuit to a motor. Accordingly, the inclination of the seat can be detected by the inclination sensing switch and the motor can be driven by operating the relay circuit. The direction of rotation of the motor can be controlled by turning on or off the inclination sensing switch and the rotational force of the motor is used to move a side support to its open or closed position. Also, a limit switch is arranged such that it is able to detect the open and closed positions of the side support.

The inclination sensing switch comprises a base member formed of a good conductor, a semi-globe-shaped case member of a good conductor containing mercury therein, and a T-shaped electrode mounted to the base member and extending into the case member.

Therefore, according to the invention, since the direction of rotation of the motor can be controlled by turning on or off the inclination sensing switch according to the inclination of the seat corresponding to the inclination of the vehicle, not only the operating condition of the vehicle around a corner but also the other ever-changing operating conditions of the vehicle such as acceleration, deceleration, bad road operation and the like can be checked with accuracy. Thanks to this, the side support can be controlled accurately according to the operating conditions of the vehicle, so that the holding and releasing of the occupant by the side support can be achieved rapidly and properly.

Also, according to the invention, due to use of the inclination sensing switch, relay circuit, limit switch which are less expensive when compared with the microcomputer and sensor employed in the above-mentioned prior art device, the side support device can be manufactured at lower costs.

Further, since the parts such as the inclination sensing switch and the like are contained together in the seat, the external wiring required can be reduced to a minimum, so that the structure of the side support device can be simplified and the side support device can be mounted to the seat of the vehicle with ease.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
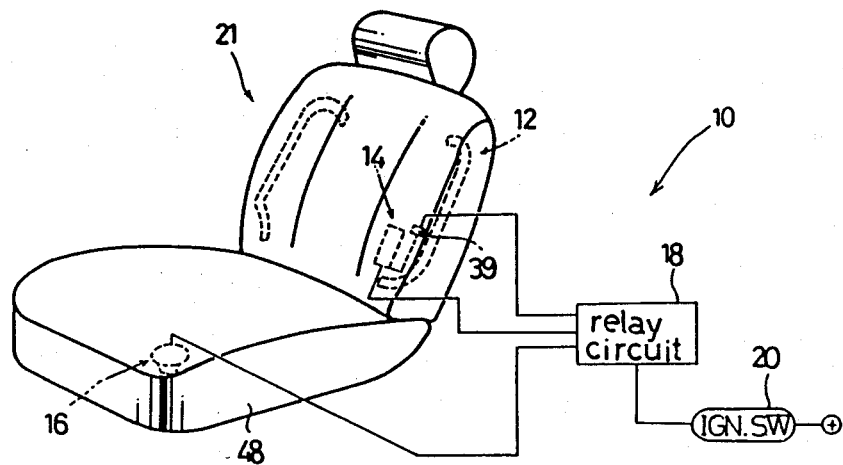
FIG. 1 is a schematic perspective view of a vehicle seat to which a side support device according to the invention is applied.

As shown in FIG. 1, a side support device 10 for use with a seat in a vehicle according to the invention comprises a side support 12, a motor 14 (generally, a DC motor) for driving the side support, an inclination sensing switch 16, and a relay circuit 18 which serves as a control circuit. The relay circuit 18 is connected through an ignition switch 20 to the positive electrode of a battery.

Figure 2:
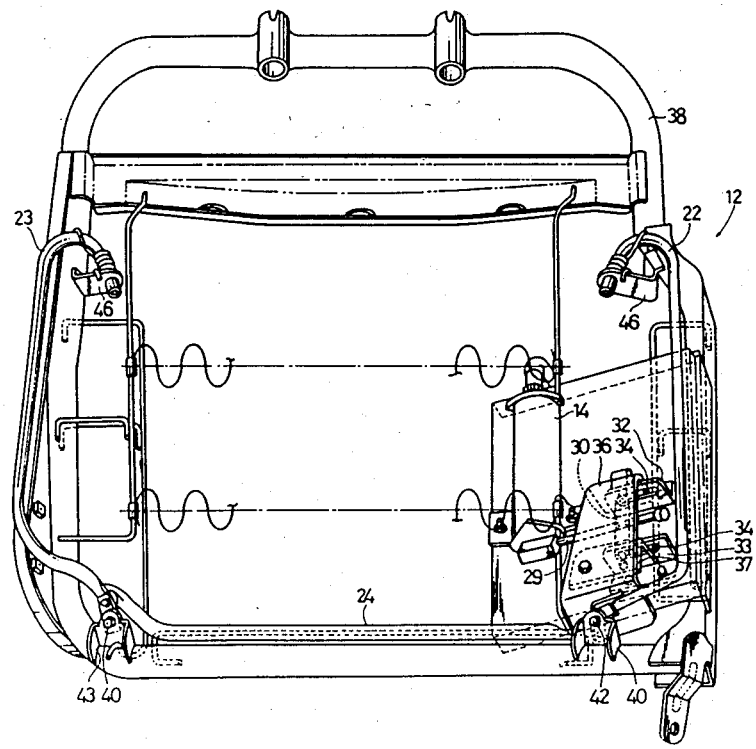
FIG. 2 is a schematic perspective view of a side support in the above side support device.
Figure 5:
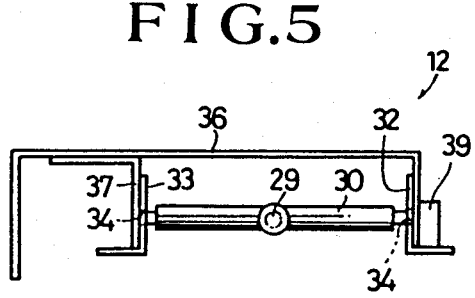
FIG. 5 is a right side view of a portion of a support frame of the side support.

Referring to the structure of the side support 12, as shown in FIG. 2, the motor 14 mounts an output shaft 29 which consists of a lead screw. This lead screw 29 is inserted through a thread hole formed in a shaft 30. As can be well understood from Fig. 5 in addition to FIG. 2, the ends of the shaft 30 extend through elongated guide grooves 34 respectively formed in support plates 32 and 33, respectively, and are also fixed to the right wall of a support frame 36 and to a support plate 37, respectively. Here, the two support plates 32 and 33 are respectively fixed to a seat back frame 38 and the support plate 37 is fixed to the support frame 36. The support frame 36 and support plate 37 are slidably mounted to the support plates 32 and 33, respectively. A limit switch 39 is arranged, for example, in the support plate 32 on the right wall of the support frame 36. This limit switch 39 is able to detect the fact that the shaft 30 reaches its right or left limit position and thereafter to stop the rotation of the motor 14. Also, a bracket 40 is fixed to the seat back frame 38 and one end of a support stay 22 is pivotally connected to the bracket 40 by a pin 42. One end of an interlocking link 24 is secured to the left wall of the support frame 36, while the leading end of the interlocking link 24 is secured to the leading end of the support stay 22 by a pin. And, the other end of the interlocking link 24 is connected to another support stay 23 and one end of the support stay 23 is pivotally connected to the bracket 40 by a pin 43. As a matter of course, the other ends of the two support stays 22 and 23 are also rotatably mounted to another bracket 46, respectively.

In the above-mentioned structure, if the lead screw 29 is rotated by means of driving of the motor 14, then the shaft 30, which is in threaded engagement with the lead screw 29 slides right and left along the guide grooves 34. And, integrally with the shaft 30, the support frame 36 slides together with the interlocking link 24. For example, if the support frame 36 slides right in FIG. 2, then the interlocking link 24 is also slides right, so that the support stay 23 is pulled by the interlocking link 24 and is thus rotated clockwise (inwardly) about the pin 43. Also, the support stay 22 is pushed by the interlocking link 24 and is rotated counterclockwise (inwardly) about the pin 42. On the other hand, if the support frame 36 and interlocking link 24 slide left, then the support stay 23 is pushed by the interlocking link 24 and is rotated counter-clockwise (outwardly) and the support stay 22 is pulled by the interlocking link 24 and is rotated clockwise (outwardly). In this manner, the two support stays 22 and 23 are always rotated in the opposite direction to each other and, thereby, the two side support sections 26 and 27 are rotated always in the opposite direction to each other, so that the side support 12 can be moved to its open or closed position. When the side support 12 reaches its open or closed position, then the limit switch 39 is caused to turn off, thereby switching off the supply of the electric current to the motor 14, so that the movement of the motor is stopped.

Figure 3:
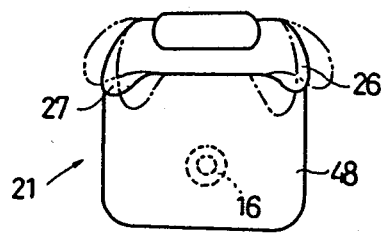
FIGS. 3 and 4 are respectively schematic plan and front views of the vehicle seat.
Figure 4:
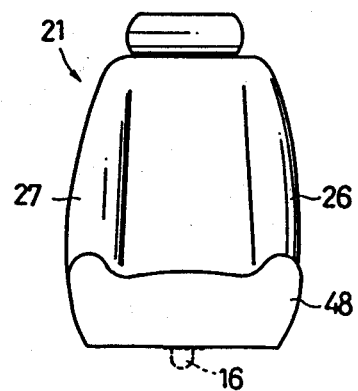

Now, the inclination sensing switch 16 is disposed at a position where the inclination of a seat 21 can be sensed or detected, for example, in the central portion of the bottom surface of a seat cushion 48 (see FIGS. 3 and 4).

The inclination sensing switch has such a structure as follows: that is, the switch comprises a case in which a liquid of a good conductor is contained and into which an electrode is inserted. Normally, when the electrode is kept apart from the liquid, the switch is kept in its off position and, when the seat 21 is inclined to some degree to thereby get the electrode immersed into the liquid, then the inclination sensing switch 16 is turned on.

Figure 6:
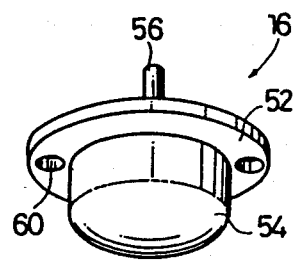
FIG. 6 is a perspective view of an inclination sensing switch.
Figure 7:
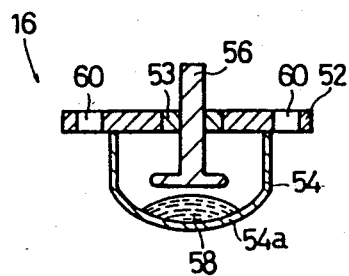
FIGS. 7 and 8 are respectively transverse section views of the inclination sensing switch when it is located at its off and on positions; and, FIG. 9 is a circuit diagram of a relay circuit employed in the invention.

Here, an inclination sensing switch of a type that contains mercury therein is given as an example. In this case, the inclination sensing switch 16, as shown in FIGS. 6 and 7, comprises a base member 52 formed of a good conductor, a case member 54 which is also formed of a good conductor and is constructed integrally with the base member 52, and an electrode 56 which is mounted through an insulating material 53 to the base member 52 and extends into the case member 54. The case member 54 is constructed in a cylindrical body having a hemi-globe-shaped base section 54a and mercury 58, which is a liquid of a good conductor, is contained in the case member 54 and stays in the base section 54a. In general, the lower end of the electrode 56 is formed in a shape that is easy to get immersed into the mercury 58, for example, in an inverted T shape. And, the electrode 56, which is insulated from the base member 52, is positively connected, while the base member 52, which is in conduction with the mercury 58 and case member 54, is negatively connected. Now, reference numeral 60 designates a mounting hole through which a bolt or the like is inserted.

Figure 8:
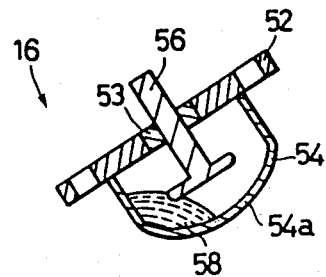

In the above-mentioned structure, if the vehicle runs in a normal condition and thus the vehicle and the seat cushion 48 are substantially horizontal, then the electrode 56 is kept off from the mercury 58 and thus the electrode 56 and base member 52 are not in conduction with each other (see FIG. 7). That is, in a normal condition, the electrode 56 and base member 52 are not allowed to conduct with each other and, therefore, the inclination sensing switch 12 is turned off. But, if the vehicle is inclined because of driving around a corner, then the inclination sensing switch 16 is also inclined together with the seat cushion 48 and thus the mercury 58 is caused to move upwardly along the wall surface of the case member 54. And, as shown in FIG. 8, when the electrode 56 gets immersed in the thus upwardly moved mercury 58, then the electrode and base member 52 are allowed to conduct with each other, thereby turning on the inclination sensing switch 16.

Figure 9:
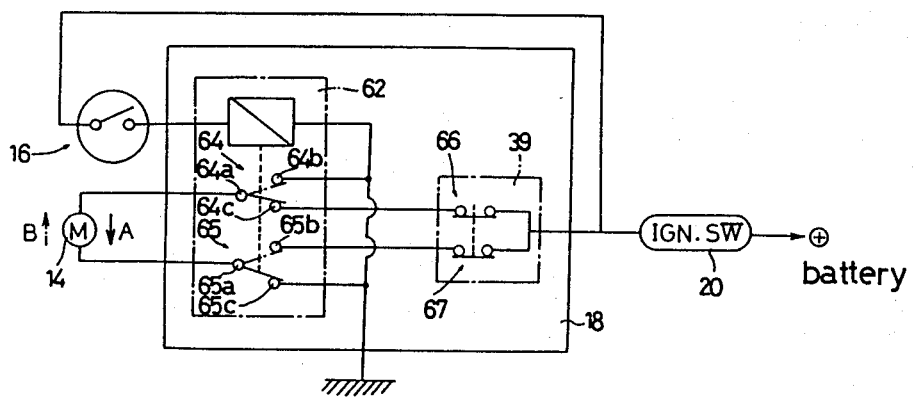

As shown in FIG. 1, the inclination sensing switch 16 is connected to the motor 14 through the relay circuit 18 which is a control circuit. Also, as can be understood from FIG. 9, the relay circuit 18 comprises the limit switch 39 mounted to the side support 12, and a relay 62 which is used to control the rotation of the motor 14. The relay circuit 18 is connected through an ignition switch 20 to the anode of the battery. The relay 62 of the relay circuit 18 includes a set of change-over switches 64, 65. These two change-over switches 64, 65, respectively have fixed terminals 64a, 65a which are connected to the motor 14 and also have pairs of change-over terminals on the respective switching sides thereof. Among the pairs of change-over terminals, the change-over terminals 64c, 65b are connected to the limit switch 39 and the remaining change-over terminals 64b, 65c are grounded. Also, the limit switch 39 includes a switch 66 for an open limit and a switch 67 for a closed limit. The switch 66 is connected to the change-over terminal 64c of the relay 62, while the switch 67 is connected to the change-over terminal 65b of the relay 62. And, in a normal condition, as shown by actual lines in FIG. 9, the fixed terminal 64a of the relay is connected to the change-over terminal 64c and the fixed terminal 65a is connected to the change-over terminal 65c, while the two switches 66, 67 of the limit switch 39 are on.

The side support 12 is controlled by the above-mentioned side support device 10 in the following manner.

As described above, in the normal condition, the inclination sensing switch 16 is off and the limit switch 39 is on. For this reason, after being seated, if the occupant turns on the ignition switch 20, then the current is allowed to flow in the direction of A shown by an actual line in FIG. 9 to thereby rotate (reversely) the motor 16, so that the side support 12 is moved to the open position thereof. When the side support 12 reaches the open position, then the limit switch 39 is turned off to thereby cause the motor 14 and side support 12 to stop.

Alternatively, however, the side support 12 may be constructed such that it will not be opened simultaneously when the ignition switch 20 is turned on. That is, a main switch may be provided in the side support device 10 and the side support 12 may be opened when the side support device 10 is turned on by the main switch.

Now, when the vehicle is moving with the side support 12 held in the open position, if the vehicle is inclined because of going around a corner, then the seat cushion 48 and inclination sensing switch 16 are inclined as well. And, the electrode 56 gets immersed in the mercury 58 to thereby allow the electrode 56 and base member 52 to conduct, so that the inclination sensing switch 16 is turned on and the relay change-over switch 64, 65 are changed over in such a manner as shown by one-dot chained lines (see FIG. 9). Simultaneously when the inclination sensing switch 16 is turned on, the limit switch 39 is also turned on. As a result of this, the current is allowed to flow in the direction of B which is shown by a one-dot chained line to thereby rotate the motor 14 (forwardly), so that the side support 12 is moved in the direction of the closed position thereof. When the side support 12 reaches the closed position, then the limit switch 39 is turned off to thereby stop the motor 14 and side support 14, so that the side support is held in the closed position.

After then, when the vehicle goes back to its normal operation and thus the body of the vehicle goes back to its normal or horizontal position, then the mercury 58 returns to the case member base section to thereby cut off conduction between the electrode 56 and base member 52, so that the inclination sensing switch 16 is turned off and the relay change-over switches 64, 65 are respectively switched over to their initial positions shown by the actual lines. As a result of this, the current flows in the A direction to thereby rotate the motor 14 reversely, with the result that the side support 12 is moved in the open position direction thereof. When the side support gets to the open position, then the limit switch 39 is turned off, thereby causing the motor 14 to stop. In this manner, the side support 12 is held in the open position.

Alternatively, a delay circuit may be interposed between the relay 62 and motor 14. That is, after the inclination sensing switch 16 is turned off, the delay circuit is used to flow the current in the A direction to the motor 14 after a lapse of a given time T1 (for example, T1=5 seconds). In this structure, even if the inclinations of the vehicle occur intermittently due to repeatedly driving around corners, the side support 12 is prevented from moving toward the open position and thus it is held at the closed position. And, after lapse of the given time T1 after the vehicle goes back to the normal operating condition, the side support 12 is moved toward the open position.

Also, preferably, the relay circuit 18 may be arranged such that the current flowing in the A direction is smaller than the current flowing in the B direction. In such structure, the moving speed of the side support 12 toward the open position is slower than the moving speed thereof toward the closed position, so that the side support 12 can be opened slowly.

As discussed before, generally, in the inclination sensing switch 16, the liquid of a good conductor is stored within the hemi-globe-shaped base section of the cylindrical case member. In this structure, the inclination directions to be detected by the inclination sensing switch 16 are not limited, that is, the inclinations in all directions, namely, at all angles of 360° can be detected. In other words, not only the inclinations of vehicle in the lateral direction occuring in the curve running but also the vehicle inclinations in the back and forth directions can be detected. For this reason, even such running conditions of the vehicle as occur when the vehicle is suddenly accelerated or decelerated, when the vehicle ascends and descends successively, when the vehicle runs with one side thereof at a higher level than the other owing to the road conditions, and when the vehicle goes along the winding roads can be detected accurately by the inclination sensing switch 16. In addition, the pitching movements (that is, upward and downward movements) of the vehicle occurring in the bad road operation can also be sensed. In this manner, the use of the inclination sensing switch 16 makes it possible to detect with accuracy the operating conditions of the vehicle that happen not only in curves but also in the acceleration or deceleration, driving on the ascending and descending roads, driving on the bad roads and the like. Accordingly, for the acceleration or deceleration, the side support 12 can be operated properly.

Also, when compared with the prior art side support device which is expensive because of a combination of a microcomputer with a sensor, the side support device according to the invention can be manufactured at low costs due to use of the inexpensive parts such as the inclination sensing switch 16, relay 62 and limit switch 39. Also, according to the invention, a structure in which the delay circuit is added can also be produced at low costs. In this manner, according to the invention, the side support device 10 can be supplied at a price which is approximately one-fourth to one-eighth the price of the side support device according to the prior art.

Further, in the present invention, since the inclination sensing switch 16 and relay circuit 18 are contained together within the seat 21, wiring can be avoided externally of the seat 21 except the wiring in connection with the ignition switch 20. Therefore, the side support device of the invention can be simplified in structure and also can be mounted with ease.

In the normal operating conditions of the vehicle in which the vehicle body stands substantially horizontal, the side support is situated at the open position and also, at the time when the vehicle comes to a stop with the ignition switch 20 off, the side support is always held at the open position. Therefore, the occupant is able to climb into or out of the vehicle quickly and easily with no restraint by the side support 12.

As mentioned above, in the structure in which the direction of the motor can be controlled by turning on or off the inclination sensing switch according to the inclination of the seat corresponding to the inclination of the vehicle, not only the driving conditions around curves but also the ever-changing conditions of the vehicle occurring when the vehicle is accelerated or decelerated and goes on bad roads can be checked accurately. Thanks to this, the side support can be controlled accurately according to the operating conditions of the vehicle and thus the holding and release of the seat occupant by the side support can be achieved quickly and properly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A side support device for use with a seat in a vehicle comprising:
   a side support disposed in the seat and adapted to be in an opened position or a closed position;
   a motor for driving said side support into the open and closed positions;
   an inclination sensing switch for detecting the inclination of the seat;
   relay circuit means connected between said inclination sensing switch and said motor, and
   wherein said relay circuit means changes the rotation of said motor forwardly or reversely responsive to said inclination sensing switch to thereby move said side support into the opened or closed position.

2. A side support device for use with a seat in a vehicle as set forth in claim 1, wherein said relay circuit means is interposed between an ignition switch and said motor, said relay circuit means comprising a relay for controlling the rotation of said motor and a limit switch for detecting the open and closed positions of said side support, and wherein said inclination sensing switch is disposed in said seat and said relay and limit switch are controlled by said inclination sensing switch to thereby change the direction of rotation of said motor, whereby operation of said side support is controlled by driving said motor according to operating conditions of said vehicle so as to prevent an occupant of the seat from losing his or her sitting position.

3. A side support device for use with a seat in a vehicle as set forth in claim 1, wherein said inclination sensing switch comprises a base member formed of a good conductor, a case member formed of a good conductor integrally with said base member and including a hemi-globe-shaped base section, an inverted-T-shaped electrode mounted through an insulating material to said base member and extending into said case member, and mercury stored within said case member.

4. A side support for use with a seat in a vehicle as set forth in claim 2, wherein said relay has two pairs of change-over switches, each switch having one fixed terminal and two change-over terminals, the fixed terminal of each switch being respectively connected to said motor, and one change-over terminal of each switch being connected to said limit switch while the other change-over terminal of each switch is grounded.

5. A side support device for use with a seat in a vehicle as set forth in claim 4, wherein said limit switch includes an open limit switch and a close limit switch, said open limit switch is connected to one change-over terminal of one relay switch and said close limit switch is connected to one change-over terminal of the other relay switch.

6. A side support device for use with a seat in a vehicle as set forth in claim 1, wherein there is interposed a delay circuit between said relay circuit means and said motor, whereby the movement of said side support in the direction of its open position is delayed by a given time.

* * * * *